United States Patent Office 3,590,102
Patented June 29, 1971

3,590,102
GRAFT POLYMERS OF ACRYLONITRILE ONTO POLYVINYLAMIDE
Carlhans Süling, Leverkusen, Karl-Erwin Schnalke, Cologne-Flittard, and Dieter Kramer, Leverkusen, Germany, assignors to Farbenfabriken Bayer Aktiengesellschaft, Leverkusen, Germany
No Drawing. Filed Mar. 1, 1968, Ser. No. 709,820
Claims priority, application Germany, Mar. 11, 1967,
F 51,798
Int. Cl. C08f 15/22
U.S. Cl. 260—883         4 Claims

ABSTRACT OF THE DISCLOSURE

Acrylonitrile graft polymers containing as a graft basis a polyvinylamide having the recurring structural unit

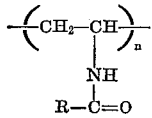

wherein R represents a lower alkyl radical and $n$ is a whole number from 3 to 300, and grafted thereon a vinyl monomer composition, consisting of at least 85% by weight of acrylonitrile and optionally an additional copolymerisable vinyl monomer.

---

This invention relates to acrylonitrile graft polymers and to a process for their production by grafting acrylonitrile, optionally in combination with other monomers, on a polyvinylamide as graft basis.

It is known that fibre-forming acrylonitrile polymers can be produced either by graft polymerization or by graft copolymerisation.

Graft polymers or graft copolymers may be prepared by converting a fibre-forming acrylonitrile polymer into filaments by a spinning process and treating the resulting filaments in the so-called aquagel state, i.e. before stretching and fixing, with monomers which react with the fibre-forming polymer by a graft reaction. It is possible in this way to modify the fibre-forming polymers by using monomers with special functional groups.

One disadvantage of this process is that, when it is carried out on a large scale, it is extremely difficult to obtain a fibre material of uniform quality because even minor differences in the conditions under which the graft reaction is carried out are sufficient to produce major differences in particularly important fibre properties. This in turn leads to changes in the affinity of the fibres for dyes and in their susceptibility to soiling.

The difficulties referred to above are avoided if the graft reaction is carried out before forming, i.e. during preparation of the polymers. Small irregularities in the composition and structure of the polymers are compensated by the dissolution process that precedes forming. A particularly uniform fibre material is always obtained if the graft substrate is sufficiently compatible with polyacrylontrile and at least as readily soluble as polyacrylonitrile in the solvent that is used to produce the spinning solution.

It is known that a variety of graft substrates may be used for graft polymerisation reactions with acrylonitrile.

In a known process (U.S. Pat. No. 2,735,830) for example, acrylonitrile is grafted on a substrate consisting of a polyvinyl alkylamide, using redox activation. Although the use of a polyvinyl alkylamide as graft substrate on the one side has the advantage that the graft substrate is compatible with polyacrylonitrile, on the other side it has the disadvantage that the resulting graft copolymers have relatively low softening points.

The limited compatibility of the polyacrylonitrile with the substituted polyacrylamide used as graft substrate, is apparent from the fact that spinnable polymers can only be obtained by graft copolymerisation using these polyacrylamides or polymethacrylamides.

It is an object of this invention to provide acrylonitrile graft polymers, which are improved in their uniformity and especially in their softening points. This object is accomplished by acrylonitrile graft polymers containing as a graft basis a polyvinylamide having the recurring structural unit of the formula

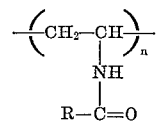

wherein R represents a lower alkyl radical and $n$ represents a whole number from 3 to 300, and grafted thereon at a vinyl monomer composition consisting of at least 85% by weight of acrylonitrile, the balance being an additional copolymerisable vinyl monomer.

It is another object of this invention to provide a process for the production of acrylonitrile graft polymers which comprises grafting a vinyl monomer composition containing at least 85% of acrylonitrile, on a graft basis consisting of a polyvinylamide having the recurring structural unit of the formula

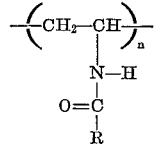

wherein R represents a lower alkyl radical and $n$ represents a whole number from 3 to 300, said grafting being effected as a precipitation polymerisation in aqueous dispersion at temperatures from 35 and 80° C. in the presence of a redox catalyst system consisting of a persulfate and a pyrosulfite at a pH-value below 7, the balance in said vinyl monomer composition being an additional copolymerisable vinyl monomer selected from the group consisting of acrylic and methacrylic esters and vinyl acetate.

The polyvinylamides are obtained by the polymerisation of compounds like N-vinylacetamide or N-vinyl propionamide and contain the following structural units

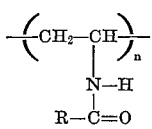

wherein R represents a lower alkyl radical and $n$ represents a number from 3 to 300. Graft substrates of this kind are capable of forming hydrogen bridge bonds by virtue of the hydrogen atom attached to the amide nitrogen. The improved resistance of the graft polymers to elevated temperatures is attributed to the hydrogen bridge bonds. It was surprising that—despite these amide hydrogen atoms—the graft substrates are highly compatible with polyacrylonitrile, in contrast to polyacrylamides or polymethacrylamides and that the graft reaction provides extremely high yields.

The polyvinylamides used as graft substrates may be prepared by methods known per se, their molecular weight being in the range of from 20,000 to 600,000.

The graft polymerisation reaction with acrylonitrile is carried out as precipitation polymerisation in aqueous dispersion. In order to obtain special fibre properties, it may be desirable to graft acrylonitrile in admixture with other vinyl monomers, e.g. acrylic or methacrylic esters or vinyl acetate. In order to obtain optimum technological properties, however, the monomer mixture should contain at least 85% by weight of acrylonitrile. In another preferred embodiment, acrylonitrile alone is graft-polymerised on polyvinylamide or on copolymers containing structural units of the above formula.

Generally the reaction is carried out in polymerising the monomeric acrylonitrile in aqueous solution in the presence of the graft polymer by means of an initiator or initiator system at a temperature in the range from 35 to 80° C. and preferably at a temperature in the range from 40 to 60° C. The concentrations in which the reactants are present should be such that, on completion of the reaction, there are approximately 3.5 to 10 parts by weight of water per part by weight of polymer in the reaction medium. A pH-value of less than 7 should be maintained during polymerisation. In a preferred embodiment, polymerisation is carried out at a pH-value in the range from 3 to 5.5. The graft polymerisation reaction may be initiated by any one of a variety of radical-formers. Redox systems comprising peroxidic compounds and reducing agents have proved to be particularly effective, especially favourable results having been obtained by using persulfates and water-soluble compounds of tetravalent sulfur.

The ratio of oxidising agent to reducing agent in the initiator system is preferably less than 1. The most suitable quantity of redox system is readily determined during preliminary tests.

It is surprising that graft polymerisation can be satisfactorily carried out in the presence of these initiator systems, insofar as the polymerisation and copolymerisation of for example, N-vinylacetamide under these conditions gives unsatisfactory polymers in poor yields.

The acrylonitrile graft copolymers are preferably used for the production of filaments and fibres which show a good natural colouring and which are receptive to dyes.

The graft substrates may be obtained for example as follows: (parts by weight relate to parts by volume like kg. to liter)

(a) 200 parts by volume of benzene are introduced into a three-necked flask equipped with stirring mechanism, reflux condenser, thermometer and nitrogen inlet, and heated to 60° C. A solution of 20 parts by weight of N-vinyl-acetamide and 0.200 part by weight (1% by weight based on monomer) of azodiisobutyrodinitrile in 100 parts by volume of benzene is then added dropwise with stirring, while nitrogen is passed through, and the entire contents of the reaction vessel are stirred for two hours at 60 to 70° C. The reaction mixture is then allowed to cool, and the polymer which precipitates is filtered off, washed with benzene and dried in vacuo at 60° C. A completely colourless and odorless dust-free powder is obtained in a yield of 98% of the theoretical. The polymer has a softening point of about 220° C. and a molecular weight of 100,000 to 120,000. Homogeneous solutions that remain clear, even in high concentrations, are obtained by dissolving the polymer in water or dimethyl formamide. By varying the conditions of polymerisation molecular weights can be obtained in the range of from 20,000 to 600,000.

(b) A solution of 7.5 parts by weight of vinyl acetate in 150 parts by volume of water containing 0.050 part by weight (0.2% by weight based on polymer) of azodiisobutyrodinitrile is introduced into the same apparatus. 17.5 parts by weight of N-vinylacetamide in 50 parts by volume of water are added dropwise with stirring over a period of 20 minutes to the solution after it has been heated to 60° C. in a nitrogen atmosphere.

The reaction solution is allowed to cool after 12 hours, giving a clear viscous solution whose solids content corresponds to a quantitative yield during polymerisation. The catalyst residues are then removed by dialysis. The solution may be mixed with dimethyl formamide or water in any ratio without clouding. K-value=55 (measured in dimethyl formamide).

The following example is to further illustrate the invention without limiting it.

EXAMPLE 1

150 parts by weight of deionised water, 7.5 parts by weight of potassium alum, 5 parts by weight of n-sulfuric acid and 6 parts by weight of the poly-N-vinyl acetamide described above in example (a) are introduced into a reaction vessel equipped with stirring mechanism, dropping funnels, reflux condenser and gas-inlet tube. After the air has been displaced by nitrogen, the contents of the vessel are heated to 53° C. The following solutions are then simultaneously added dropwise to this solution over a period of 3 hours:

(I) 0.7 part by weight of potassium peroxydisulfate, 200 parts by weight of deionised water, and 3 parts by weight of n-sulfuric acid (II) 0.9 part by weight of sodium pyrosulfite, and 200 parts by weight of deionised water (III) 100 parts by weight of acrylonitrile.

After the solutions have been added, the contents of the vessel are stirred for 1 hour at 53° C. The product which precipitates is isolated and washed and dried at 50° C. A polymer with a K-value of 86.7 is obtained in a yield of 92%.

What we claim is:

1. An acrylonitrile graft polymer containing as a graft basis a polyvinylamide having the recurring structural unit of the formula

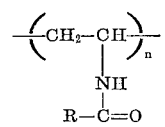

wherein R represents a lower alkyl radical and $n$ represents a whole number from 3 to 300, and grafted thereon a vinyl monomer composition consisting of at least 85% by weight of acrylonitrile, the balance being an additional copolymerisable vinyl monomer.

2. The acrylonitrile graft polymer of claim 1, said polyvinylamide being polyvinylacetamide having a molecular weight in the range of 20,000 to 600,000.

3. The acrylonitrile graft polymer of claim 1, said additional copolymerisable vinyl monomer being selected from the group consisting of acrylic and methacrylic acid esters and vinylacetate.

4. A process for the production of acrylonitrile graft polymers which comprises grafting a vinyl monomer composition containing at least 85% by weight of acrylonitrile, on a graft basis consisting of a polyvinylamide having the recurring structural unit of the formula

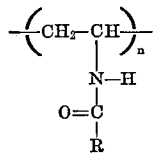

wherein R represent a lower alkyl radical and $n$ represents a whole number from 3 to 300, said grafting being effected as a precipitation polymerisation in aqueous dispersion, at temperatures of between 35 and 80° C., in the presence of a redox catalyst system consisting of a persulfate and a pyrosulfite at a pH-value below 7, the balance in said vinyl monomer composition being an additional copolymerisable vinyl monomer selected from the group consisting of acrylic and methacrylic esters and vinyl acetate.

References Cited
UNITED STATES PATENTS
2,735,830   2/1956   Coover _____ 260—883

MURRAY TILLMAN, Primary Examiner
R. J. SEIBERT, Assistant Examiner

U.S. Cl. X.R.
260—29.6, 881